(12) United States Patent
Kremerman (10) Patent No.: US 10,874,955 B2
(45) Date of Patent: Dec. 29, 2020

(54) SHORT DISTILLATION HEAD WITH INTEGRATED COOLING JACKET

(71) Applicant: Elliot Kremerman, Los Gatos, CA (US)

(72) Inventor: Elliot Kremerman, Los Gatos, CA (US)

(*) Notice: Subject to any disclaimer, the term of this patent is extended or adjusted under 35 U.S.C. 154(b) by 0 days.

(21) Appl. No.: 16/926,859

(22) Filed: Jul. 13, 2020

(65) Prior Publication Data
US 2020/0338468 A1 Oct. 29, 2020

(51) Int. Cl.
*B01D 1/08* (2006.01)
*B01D 5/00* (2006.01)
*B01D 3/32* (2006.01)

(52) U.S. Cl.
CPC ............... *B01D 1/08* (2013.01); *B01D 3/32* (2013.01); *B01D 5/006* (2013.01); *B01D 5/0012* (2013.01)

(58) Field of Classification Search
CPC .......... B01D 1/08; B01D 3/32; B01D 5/0012; B01D 5/006
See application file for complete search history.

(56) References Cited

U.S. PATENT DOCUMENTS

| | | | |
|---|---|---|---|
| 2,427,142 A * | 9/1947 | Hornbacher | B01J 19/30 165/73 |
| D173,603 S | 12/1954 | Atkinson | |
| 3,020,215 A | 2/1962 | Weber | |
| 3,271,935 A | 9/1966 | Smith | |
| 3,334,025 A | 8/1967 | Reid | |
| 3,340,157 A * | 9/1967 | Weiss | B01D 1/0017 202/180 |
| 3,416,999 A * | 12/1968 | Shepherd | C01B 6/10 202/161 |
| 3,607,662 A * | 9/1971 | Glover | B01D 5/0045 202/160 |
| D247,248 S | 2/1978 | Durot | |
| 4,089,749 A | 5/1978 | Karamian | |
| D248,485 S | 7/1978 | Strauss | |
| 4,159,817 A | 7/1979 | Ikawa | |
| 4,230,536 A | 10/1980 | Sech | |
| 4,303,614 A | 12/1981 | Spring | |
| 4,471,836 A * | 9/1984 | Hokanson | F28B 9/10 165/111 |
| D293,128 S | 12/1987 | Karamian | |
| D293,368 S | 12/1987 | Karamian | |
| D306,338 S | 2/1990 | Rempe | |
| D314,225 S | 1/1991 | Palmer | |
| D316,739 S | 5/1991 | Erickson | |
| D339,862 S | 9/1993 | Weber | |

(Continued)

*Primary Examiner* — Jonathan Miller
(74) *Attorney, Agent, or Firm* — Michael J. Feigin, Esq.; Feigin and Fridman LLC (57) ABSTRACT

A distillation apparatus has a cooling jacket, in the shape of a halo, surrounding at least a part of a vertical extent of a fraction collector in the disclosed technology. Connecting to and/or extending into an interior space of the fraction collector is an end of a vertically-extending passageway. This passageway is functionally connected at an other end to a lower-end entry portal. An outer cover substantially covers the cooling jacket, fraction collector, and a portion of the vertically-extending passageway, excepting for a top portal, a side exit portal, at least one cooling jacket intake, and at least one cooling jacket outtake.

19 Claims, 10 Drawing Sheets

(56) References Cited

U.S. PATENT DOCUMENTS

| | | |
|---|---|---|
| 5,354,428 A | 10/1994 | Clark |
| D358,448 S | 5/1995 | Paoli |
| 5,411,707 A | 5/1995 | Hiatt |
| 5,711,857 A | 1/1998 | Armstrong |
| 5,885,313 A * | 3/1999 | Okamoto ............... B01D 3/085 55/315.2 |
| D412,550 S | 8/1999 | Bell |
| D425,174 S | 5/2000 | Swancara |
| D432,203 S | 10/2000 | Edwards |
| D455,813 S | 4/2002 | Mount |
| D458,340 S | 6/2002 | Lindahl |
| 6,551,464 B1 | 4/2003 | Kimel |
| D634,397 S | 3/2011 | Lautzenheiser |
| D706,386 S | 6/2014 | Ambler |
| D727,460 S | 4/2015 | Collins |
| D728,854 S | 5/2015 | Siniakov |
| D731,615 S | 6/2015 | Ambler |
| 9,138,657 B1 | 9/2015 | Wiederin |
| D775,310 S | 12/2016 | Kremerman |
| D776,238 S | 1/2017 | Kremerman |
| D780,286 S | 2/2017 | Ausner |
| D787,630 S | 5/2017 | Lipkens |
| 9,895,626 B2 * | 2/2018 | Kremerman ............. B01J 19/30 |
| 10,279,281 B2 * | 5/2019 | Kremerman ........... B01D 3/143 |
| 10,406,451 B2 * | 9/2019 | Maibach ................. B01D 3/16 |
| 10,493,374 B2 * | 12/2019 | Wells ..................... B01D 5/006 |
| 10,751,638 B2 * | 8/2020 | Maibach, Jr. .......... B01D 5/006 |
| 2018/0065060 A1 * | 3/2018 | Wells ....................... B01D 3/12 |
| 2018/0290074 A1 * | 10/2018 | Kremerman ........... B01D 3/085 |
| 2019/0076752 A1 * | 3/2019 | Maibach ................ B01D 5/006 |

* cited by examiner

SHORT DISTILLATION HEAD WITH INTEGRATED COOLING JACKET

FIELD OF THE DISCLOSED TECHNOLOGY

The disclosed technology relates generally to distillation and, more specifically, to a short path distillation head with an integrated cooling jacket.

BACKGROUND

Distillation or fractional distillation is carried out by heating a solid or liquid and removing gaseous vapors that are expelled therefrom. This is typically carried out by raising the temperature and boiling off fractions of the solid or liquid based on their differing boiling points. Separated compounds are removed from a distillation apparatus into an attached condenser in order to be converted from gas into a solid or liquid. Sometimes, however, the condensation process can be slow and/or less than precise when fractions have close boiling points and thus prevent the distillation from functioning at peak efficiency.

Therefore, there is therefore a need for a distillation system which separates fractions more precisely and faster without compromising the efficacy of the distillation.

SUMMARY OF THE DISCLOSED TECHNOLOGY

The disclosed technology is a distillation head and fraction collector with an in-built cooling jacket. This novel combination increases the speed and efficacy of the distillation process by adding a more rigorous step of cooling/condensation before the product exits the fraction collector.

A distillation apparatus of embodiments of the disclosed technology has a cooling jacket, in the shape of a halo, surrounding at least a part of a vertical extent of a fraction collector. Connecting to and/or extending into an interior space of the fraction collector is an end of a vertically-extending passageway. This passageway is functionally connected at an other end to a lower-end entry portal.

"Functionally connected" is defined as "having a continuous passageway for vapors or liquids to pass through." "Collector" is defined as "a device which is closed except for portals of entry or exit for gases or liquids, each portal being within a single side of a respective collector." "Fraction collector" is defined as "a device used to collect individual portions of mixtures separated through distillation, the separated portions being partially, substantially, or fully condensed therein". "Cooling jacket" is defined as "a hollow part of a device through which coolant, such as water, flows such that a temperature of an area which the hollow part surrounds is lowered".

"Halo" is defined as "a hollow torus-shaped region which at least surrounds at least a part of a vertically extending passageway of a distillation device" and/or "a rounded ring shape whose outermost circumference and whose innermost circumference are concentric circles, and of which every cross-section is a substantially identical circle or oval with a center equidistantly-spaced from a center of the concentric circles".

A "distillation apparatus" is defined as a device in which vapors of a solid, liquid, or combination solid and liquid product to be distilled move upwards therein before exiting therefrom such as into a distribution adapter or condenser. "Distillate" refers to, and is defined as, the vapor, liquid, or combination thereof which exits, by way of the fraction collector, from the distillation head and is ultimately fractionally distilled into component parts, each component part having different physical properties such as a different boiling point.

In some embodiments, an outer cover surrounds the fraction collector, the cooling jacket, and at least a majority of the vertically extending passageway. An intake and an outtake of the cooling jacket, in embodiments, can pass through the outer cover.

"Intake" is defined as "an area through which a substance or object, e.g. coolant, is brought into an area or part of a device". "Outtake" is defined as "an area through which a substance or object, e.g. coolant, is expelled from an area or part of a device".

The fraction collector, in various embodiments of the disclosed technology, has an outer wall with a curvilinear upper portion, a curvilinear lower portion, and a vertical middle portion. The vertical middle wall can form a unitary wall with the curvilinear upper portion and the curvilinear lower portion of the wall. In embodiments, the vertical middle portion may be simultaneously an interior wall of the cooling jacket and outer wall of a part or all of the fraction collector.

"Interior" is defined as "a mostly enclosed space and passageway designed for passage of gas, liquid and/or solid there-through". "Exterior" is defined as "outside of and relative to a mostly enclosed space.".

In some embodiments, the cooling jacket further comprises an interior space. This interior space is separate from a continuous passageway formed within the vertically extending passageway, the fraction collector, a side exit portal of the fraction collector, and a top portal of the fraction collector.

An exterior (outer) wall of the cooling jacket is, in some embodiments, unbroken and/or uninterrupted but for the intake and the outtake.

In embodiments, the outer cover may directly surround an entirety of a vertical extent of the exterior wall of the cooling jacket and the upper and the lower portions of the wall of the fraction collector. The vertical middle wall of said fraction collector may be surrounded by both the outer cover and the cooling jacket.

An entirety of said cooling jacket is, in embodiments, above the side exit portal of the fraction collector.

The vertically extending passageway, in some embodiments, further has a top edge which extends into a part of the fraction collector which is surrounded by the lower portions of the wall of the fraction collector. This top edge may terminate inline with a part of the side exit portal which is below a top part of the side exit portal, and may be situated below a horizontal plane of a lowest edge of the cooling jacket.

"Inline" is defined as "sharing a horizontal or vertical plane therewith".

In various embodiments, the vertically extending passageway further has a lower collection region and a tube. A largest circumference of the lower collection region can be wider than a largest circumference of the tube, and the largest circumference of the lower collection region can be substantially equal to a circumference of the interior wall of the cooling jacket.

"Circumference" is defined as "measure of a length of a circular or ovoid enclosing boundary of a named part of the device described herein".

The cooling jacket intake is, in some embodiments of the disclosed technology, situated horizontally inline with the cooling jacket outtake. In other embodiments, all horizontal planes passing through the cooling jacket intake are below all horizontal planes passing through the cooling jacket outtake, and the cooling jacket outtake is vertically inline with the side exit portal.

Described differently, a distillation apparatus of embodiments of the disclosed technology has a first continuous internal region extending from a bottom end of the apparatus to a side exit portal. A cooling jacket with a second continuous internal region, forming a separate interior space than the first continuous internal region, surrounds a portion of a vertical extent of the continuous internal region. At least a part of an interior wall of the cooling jacket is simultaneously a part of said exterior wall of the vertical extent. In some embodiments, the internal region may extend below the cooling jacket.

"Vertical extent" is defined as "a portion which has a vertical length throughout which its cross-sections are substantially identical".

The distillation apparatus further has, in various embodiments, an outer cover surrounding each of substantially an entirety of the first continuous internal region and the cooling jacket. The outer cover can have therein a top portal of the first continuous internal region. It can have therein an intake of the cooling jacket which further passes through the exterior wall of the cooling jacket and/or an outtake of the cooling jacket which further passes through the exterior wall of the cooling jacket. It can also have therein a side exit portal of the first continuous internal region. In some embodiments, all horizontal planes passing through the side exit portal are below all horizontal planes passing through each of the intake and the outtake.

"Surrounding" is defined as "forming a unitary structure and covering and/or being contiguous with at least one point on every vertical or on every horizontal line on a thing being surrounded".

In various embodiments, the distillation tube has an uppermost edge which extends into the vertical extent and terminates below a horizontal plane passing through an uppermost edge of the side exit portal.

The first internal region, in embodiments, further has a fraction collector having horizontally-aligned circumferences greater than a portion of a rest of the internal region there-below. The cooling jacket can surround the fraction collector portion of the first continuous internal region.

The directional descriptors used in this disclosure, such as "top", "bottom", "vertical", "horizontal", "upper", "lower", "above", and "below" are relative to a typical direction of use with a heat source below the portion of the vertically-extending passageway substantially farthest from a top portal of the apparatus.

Any device or step to a method described in this disclosure can comprise, or consist of, that which it is a part of, or the parts which make up the device or step. The term "and/or" is inclusive of the items which it joins linguistically and each item by itself. Any element or described portion of the devices shown can be "substantially" as such, if used in the claims in this manner. Where used, "substantially" is defined as "within a 5% tolerance level thereof."

DETAILED DESCRIPTION OF EMBODIMENTS OF THE DISCLOSED TECHNOLOGY

The distillation apparatus of the disclosed technology has a cooling jacket, in the shape of a halo, surrounding at least a part of a vertical extent of a fraction collector. Connecting to and/or extending into an interior space of the fraction collector is an end of a vertically-extending passageway. This passageway is functionally connected at an other end to a lower-end entry portal. An outer cover substantially covers the cooling jacket, fraction collector, and a portion of the vertically-extending passageway, excepting for a top portal, a side exit portal, at least one cooling jacket intake, and at least one cooling jacket outtake.

Embodiments of the disclosed technology will become more clear in view of the following discussion of the figures.

Figure 1:
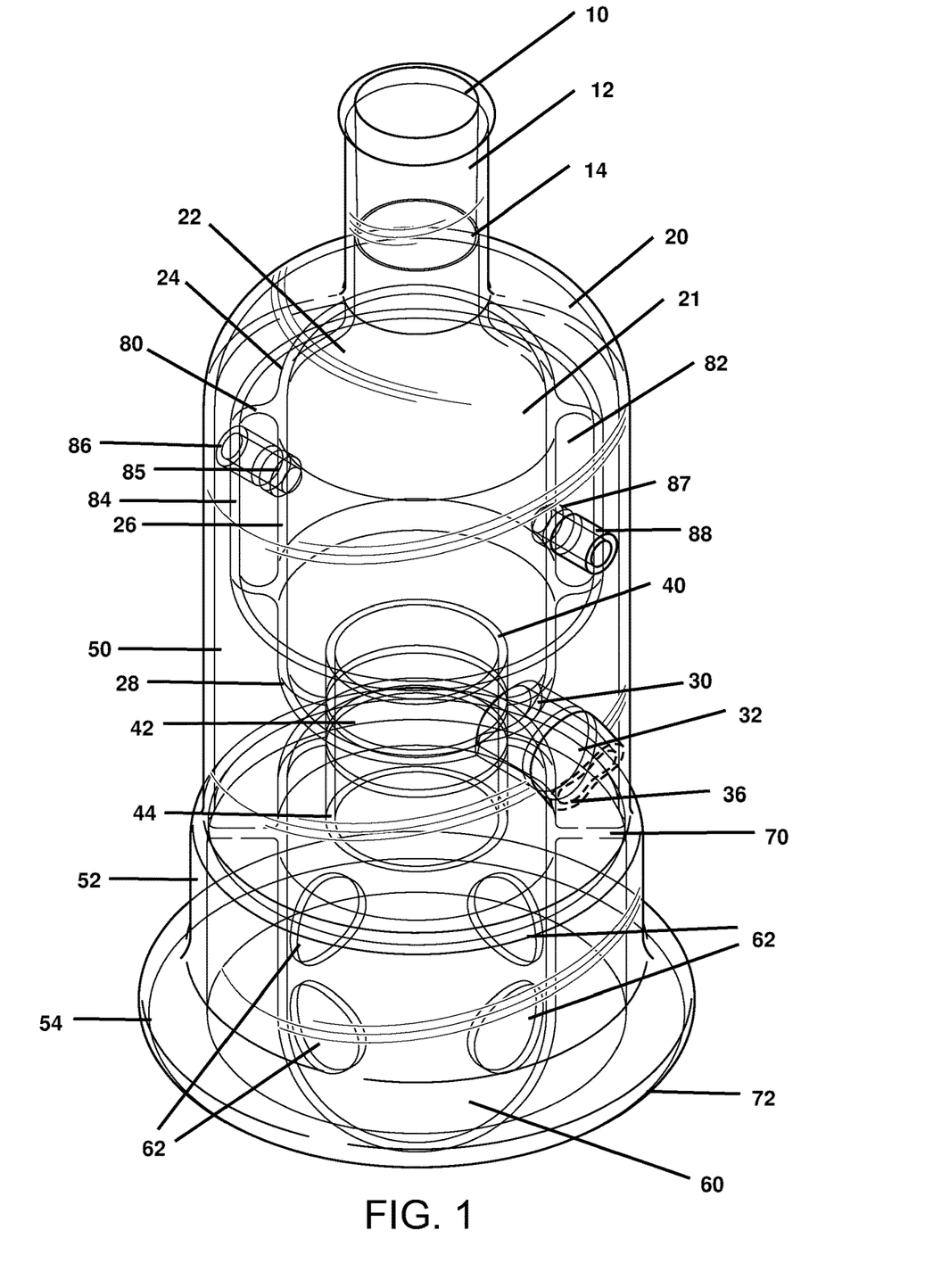
FIG. 1 shows a top and side perspective view of a distillation apparatus of embodiments of the disclosed technology.
Figure 2:
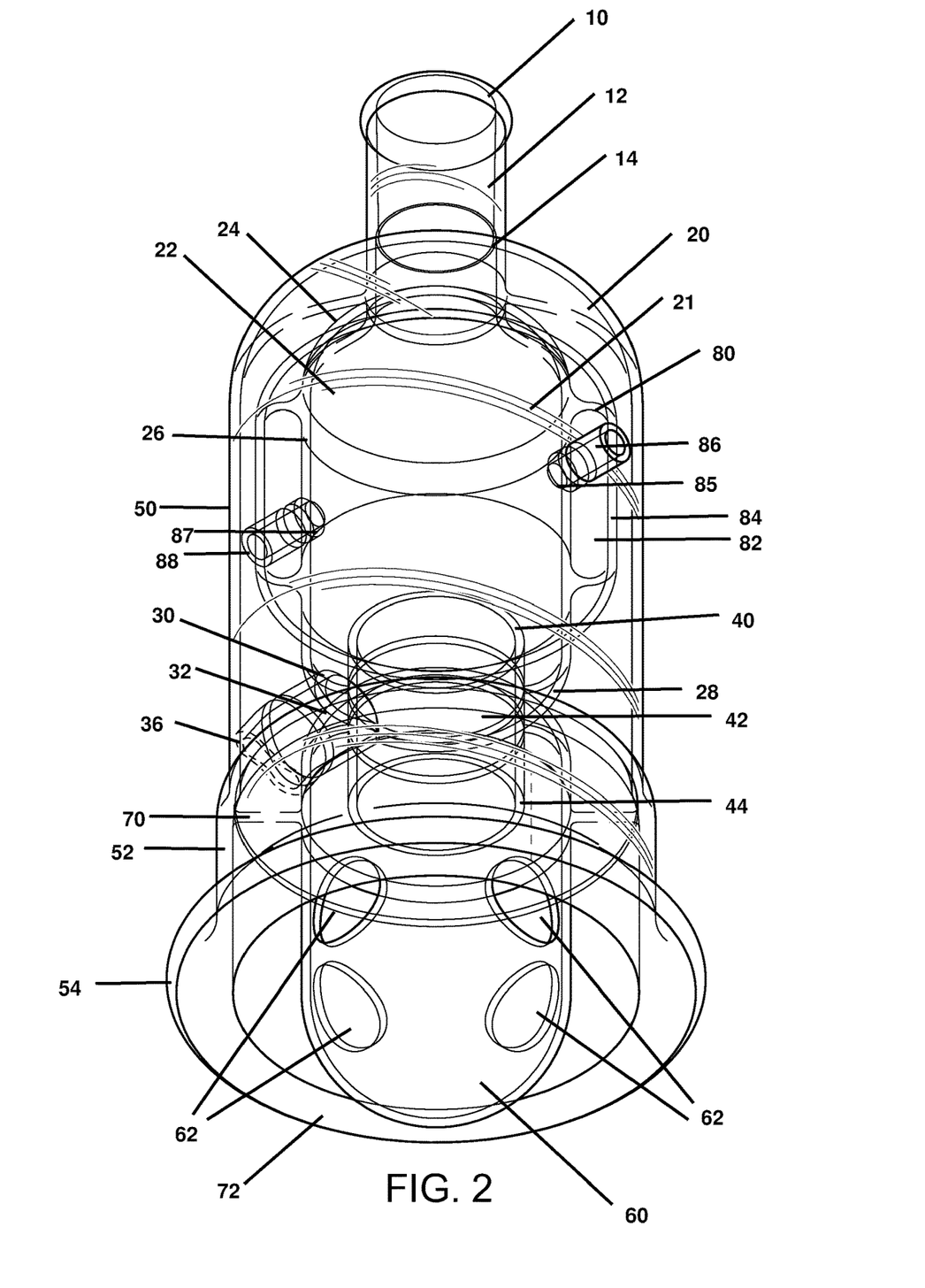
FIG. 2 shows a reverse bottom and side perspective view of the distillation apparatus of FIG. 1.

Discussing FIGS. 1 and 2 simultaneously, FIG. 1 shows a top and side perspective view of a distillation apparatus of embodiments of the disclosed technology. FIG. 2 shows a reverse bottom and side perspective view of the distillation apparatus of FIG. 1. Describing from roughly top to bottom for ease of reading, at the top, in some embodiments, a top portal 10 functionally connects/opens into a neck 12 where one can insert a thermometer, stopper, distillation key, or the like to close the portal 10. In other embodiments, the fraction collector 22 can be closed at a top side. Here, the fraction collector 22 has a top portal 14 which is a width of the neck 12 through which vapors/gasses can escape upwards.

The fraction collector 22 has a bottom side 29 which can be a) angled, relative to the bottom of the device, and/or b) flat/horizontal relative to the bottom of the device. The bottom side 29 of the fraction collector 22 can have an opening there-in through which a tube 42 passes therein. The tube 42 extends vertically in some embodiments of the disclosed technology and has openings at each of a top edge 40 and bottom edge 44. The top edge 40 and opening into the fraction collector 22 is within a space circumscribed by (surrounded by or substantially surrounded by) the fraction collector. In this manner, vapors which extend above the vertical tube must condense before dropping to the bottom side 29 of the fraction collector which is in line with a side exit portal 30 which passes between the fraction collector 22 and condenser entry area 32 before entering a main body of the condenser 34 where the liquids are further cooled, such as by way of a cold water flow, or other coolant, around the path of the liquid passing through the condenser. Cold water is defined as water which has a temperature substantially equal to or below ambient room temperature. In other embodiments, the top edge 40 of vertical tube 42 terminates at a bottommost part of the lower curvilinear wall 28 and/or of a wall of fraction collector 22 rather than extending into fraction collector 22.

In the embodiment shown, the fraction collector 22 has walls comprising an upper curvilinear section 24, a middle vertical extent 26, and a lower curvilinear section 28. In other embodiments, there exist one or more additional wall segments with same or different shapes.

Partially or wholly surrounding the middle vertical extent 26 is a cooling jacket 80. In other embodiments, the cooling jacket 80 surrounds different or additional segments of fraction collector 22 such as one or more of the upper curvilinear section 24 and lower curvilinear section 28. In further embodiments, the cooling jacket 80 further surrounds at least a portion of vertical tube 42. At least a part of middle vertical extent 26 or any other part of the fraction collector or vertically extending tubes described herein, is, in embodiments of the disclosed technology, simultaneously an interior wall of the cooling jacket 80. In other embodiments, there exists an interior wall of cooling jacket 80 which is distinct and/or separate from the middle vertical extent 26 and/or of the walls of fraction collector 22. The cooling jacket 80 has an exterior wall 84 which defines an interior space 82. In various embodiments, the interior space 82 is substantially halo-shaped and is separate from an interior space 21 of the fraction collector 22, tube 42, and lower collection area 60.

An intake tube 86 and an outtake tube 88 of the cooling jacket 80 connect, respectively, to portals 85 and 87 in the exterior wall 84 of cooling jacket 80. In various embodiments, the intake tube 86 and portal 85, and the outtake tube 88 and portal 87, are located inline (in a same horizontally or vertically-oriented plane) with each other, or are disposed such that intake tube and portal 86, 85 are vertically above or below (in a same vertically-oriented plane) outtake tube and portal 88, 87. Intake tube and portal 86, 85 may be offset from outtake tube and portal 88, 87 by any number of degrees, such as 180 or 90. Intake tube 86 and outtake tube 88 may be substantially identical. Intake portal 85 and outtake portal 87 may be substantially identical. Intake tube and portal 86, 85 and/or outtake tube and portal 88, 87 may be horizontally inline with and/or vertically inline with side exit portal 30 and/or condenser entry area 32.

In some embodiments of the disclosed technology, a lower collector region 60 is functionally connected (opens into) the (vertical) tube 42 by way of the lower portal 44 of the tube. The tube 42 extends below and into an interior circumscribed (substantially surrounded by) the lower collector region 60. By way of this passage of the tube 42 into the lower collector region 60, a rejection area is created between the tube 42, top side of the lower collector region 60, and side wall of the lower collector region 60 (e.g. at each horizontal plane which crosses between the tube and lower collector region beneath of the upper wall of the lower collector region). Vapors then experience turbulent flow or condensation causing movement downwards until passing upwards through the lower portal 44 of the tube 42.

In another embodiment, vapors rise directly into at least one portal 62 of vertical tube 42. Vertical tube 42 may have, in various embodiments, a more and/or a less bulbous portion thereof.

Describing the lower collector region 60 in more detail, in some embodiments this region has a flat upper side at, or substantially at, a height which is through a halfway point of the vertical tube 42. The flat (horizontal) upper side has rounded corners which curve into vertical sidewalls which then extend vertically until reaching a spheroid lower end with a semi-spherical bottom in some embodiments of the disclosed technology. In other embodiments, the lower end and bottom of the (bulbous) lower collection region may be sharply angled and/or open. A row of portals 62 are found in embodiments of the disclosed technology. The portals are an entry point into the lower collection region 60 for vapors rising up from a flask or item being heated below the distillation apparatus shown (not shown). The portals 62 can be one, two, four, or more portals row and can each be a same size and each or some have circular openings. As such, vapors extend around the lower collector region 60 and pass indirectly (must change directions during movement) into the side portals 62.

In some embodiments, a bottom end of a vertically-extending distillation tube and/or the lower collection region 60 has a portal open to a bottom side of the device, such as a portal and bottom end thereof which are, or can be, inserted into a boiling flask. In such an instance, vapors extending upwards from the boiling flask further continue to extend upwards into the distillation tube, such as in a manner lacking obstruction between a top end of the boiling flask and the bottom portal into the distillation tube.

Vapors which continue past the side portals become rejected between the outer cover 20 and lower collector region 60, more specifically, at a horizontal seal 70. Thus, vapors move upwards around the lower collector region 60 into the outer cover 20 at the bottom entry portal 72 and upwards in the space between the outer cover 20 and lower collector region 60 until either hitting the horizontal seal 70 or entering into a side portal 62 of the lower collector region 60. Vapors which enter into the lower collector region 60 by way of a portal 62 can continue to move upwards through the tube 42 if not rejected by extending past the lowest edge 44 of the tube 42 without entering-therein. Vapors which do enter the tube 42 continue upwards into the fraction collector 22 before condensing and falling to the bottom 29 of the fraction collector 22. Continued upward moving vapors from the vertical tube, which are often warmer than the condensing vapors, prevent a majority or substantially all of condensed liquid, in embodiments of the disclosed technology, from falling down through the vertical tube 42. Rather, the vapors condense into liquid at the bottom 29 of the fraction collector 22, outside of the tube 42 and then flow out the side portal 30 which shares a lowest side or floor with the fraction collector, passing then into the condenser 34.

Figure 3:
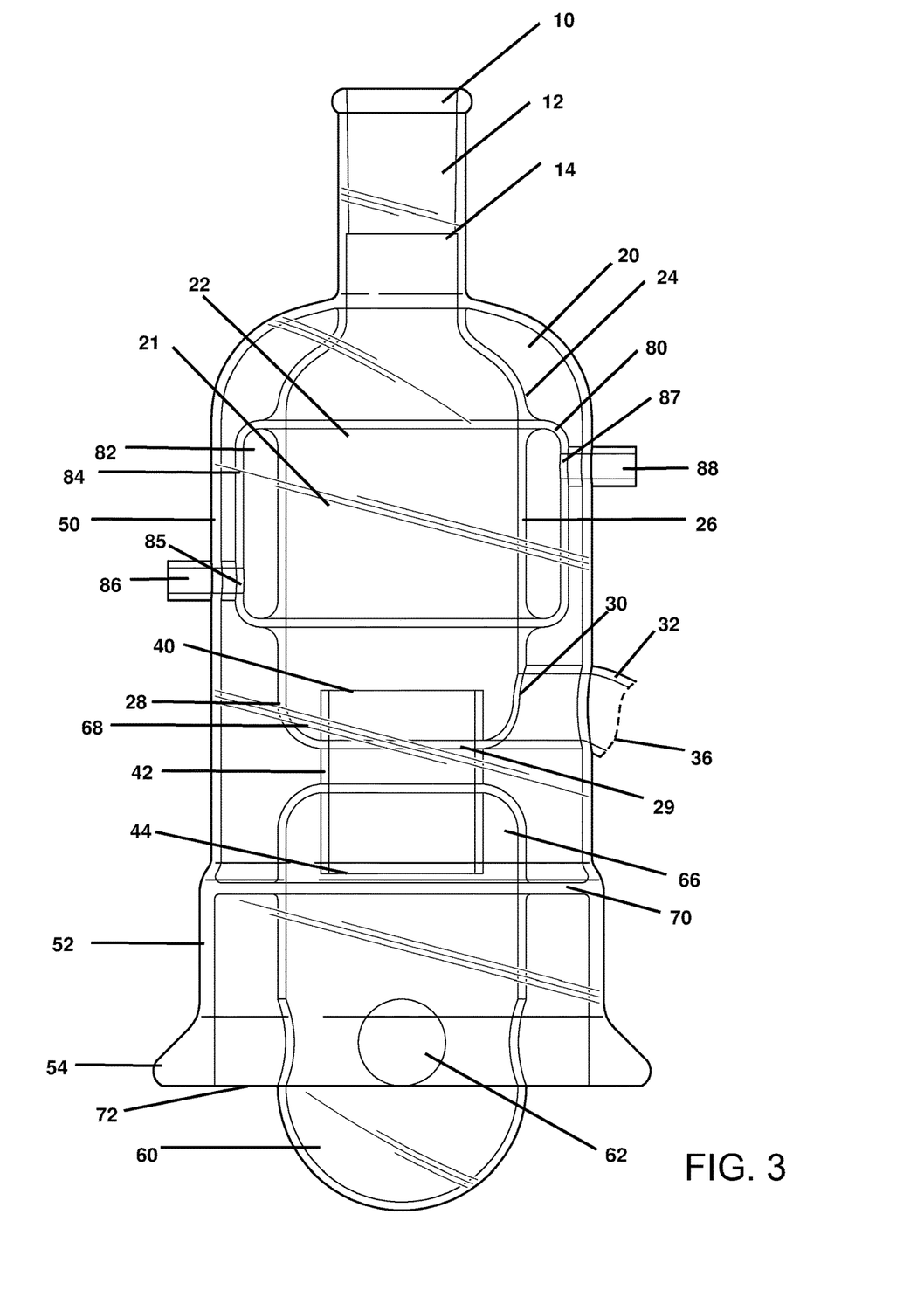
FIG. 3 shows a front elevation view of the distillation apparatus of FIG. 1.
Figure 4:
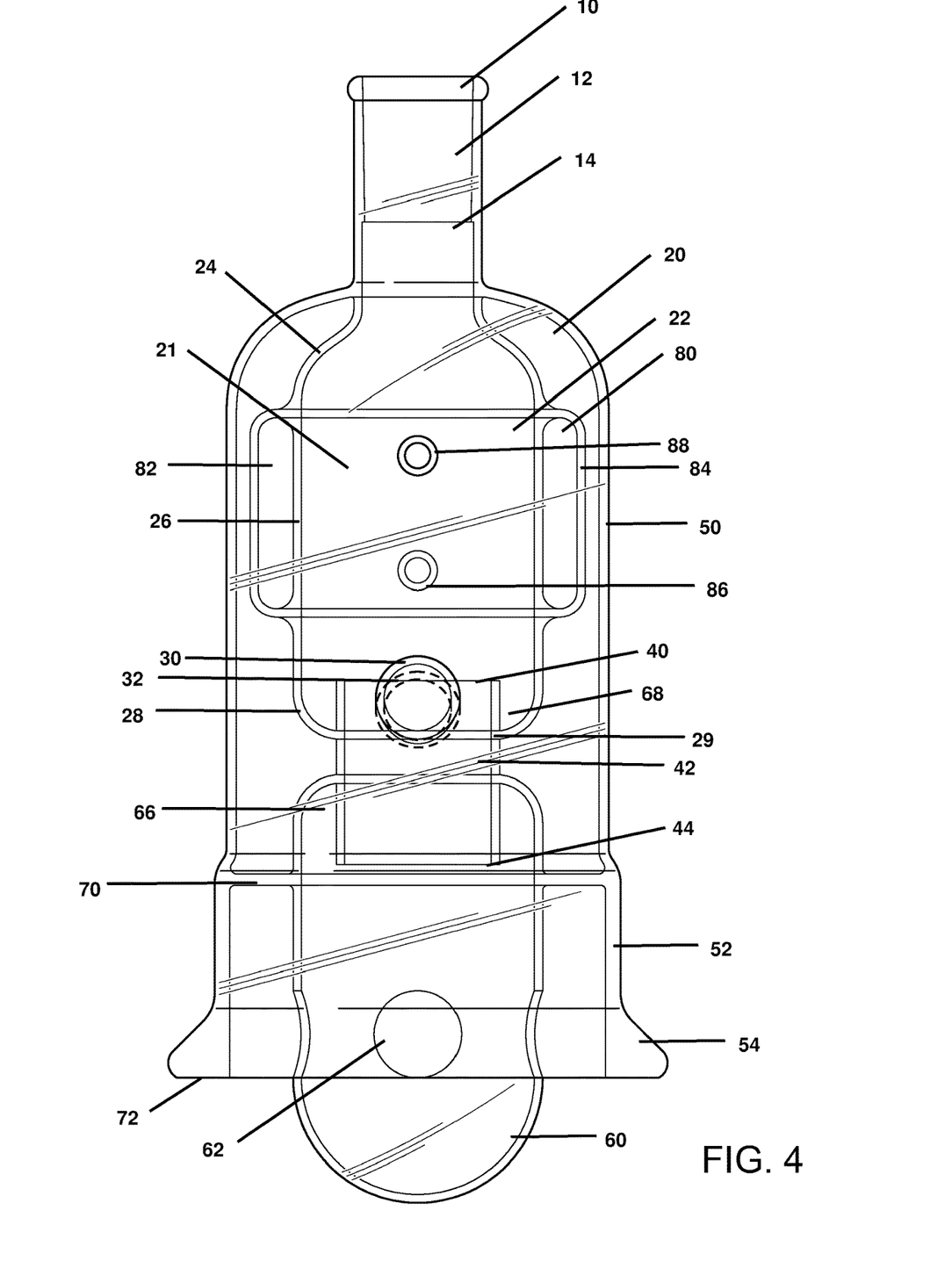
FIG. 4 shows a side elevation view of the distillation apparatus of FIG. 1.
Figure 5:
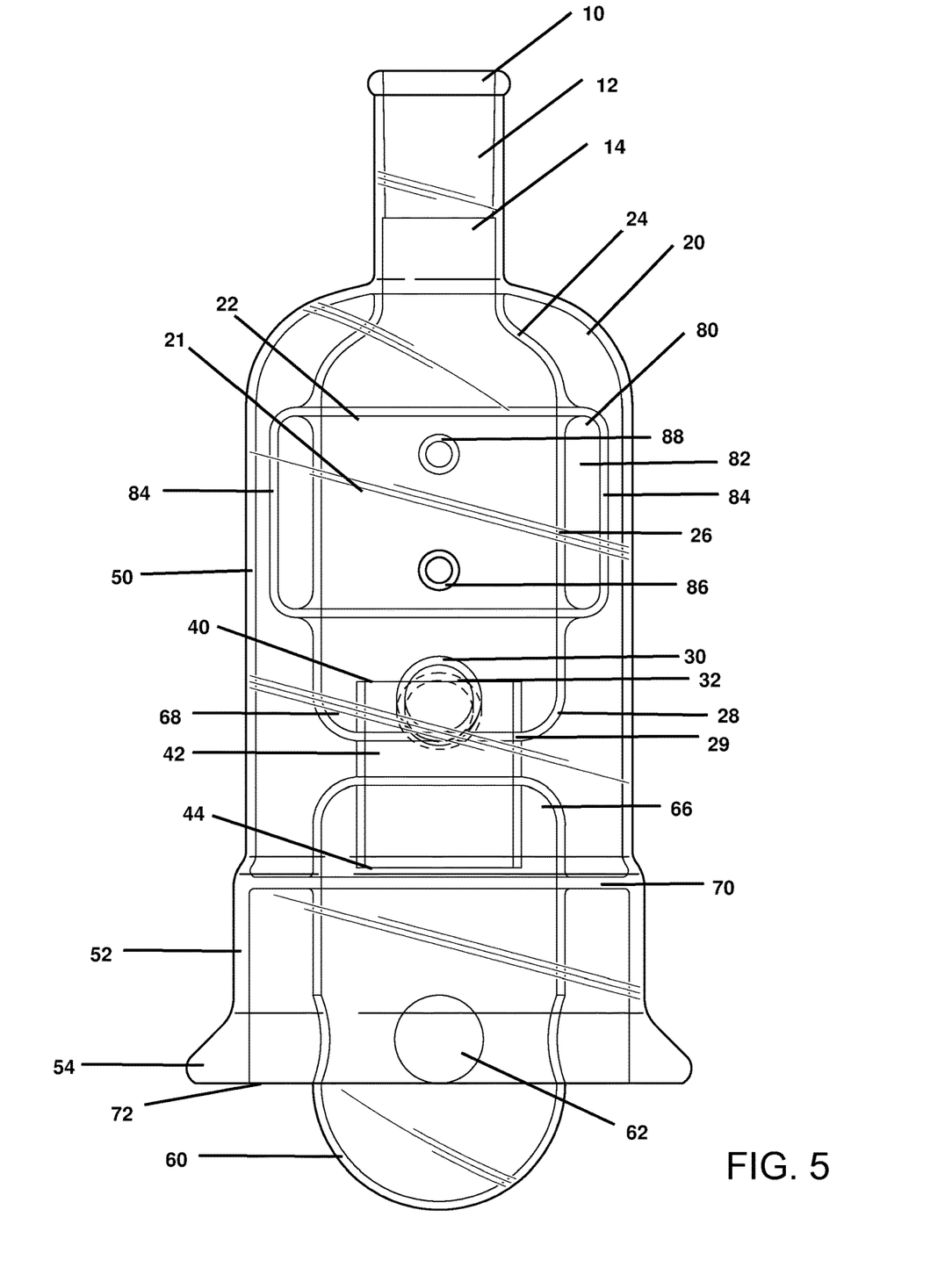
FIG. 5 shows a side elevation view of the distillation apparatus of FIG. 1.

FIGS. 3-5 show various front and side elevation views of the distillation apparatus of FIG. 1. FIG. 3 shows a front elevation view of the distillation apparatus of FIG. 1. FIGS. 4 and 5 show, respectively a side and a reverse side elevation view of the distillation apparatus of FIG. 1.

Discussing now the outer cover 20, this cover surrounds the fraction collector 22 and cooling jacket 80, such as in an unencumbered manner, at every horizontal cross section in embodiments of the disclosed technology but for where the side portal 30, intake tube 86, and outtake tube 88 extend there-through. "Unencumbered" is defined as "at a horizontal cross section, having no other portion of the distillation apparatus surrounding or to the outside of." An interior space of the jacket 80 is also unencumbered, in embodiments of the disclosed technology.

The outer cover further surrounds the tube 40, a part of the tube 40 being unencumbered by other elements (e.g. fraction collector or lower collection region) in some embodiments of the disclosed technology. The outer cover further surrounds part or a majority of (more than 50%) the lower collector region 60 and the cooling jacket 80 covers a majority of the fraction collector 22 and/or minority of a vertical tube 40. Side walls 50 form a right angle or substantially a right angle or rounded corner with a horizontal seal 70 in a unitary connection in embodiments of the disclosed technology.

At bottom ends of the side walls 50, the side walls can have a wider region 52 and a flared edge 54 which are adapted to cover and substantially or fully create a seal or airtight seal or connection with an upper end of a flask or boiling flask. As such, vapors extending out of a flask situated below the distillation device shown (e.g. in FIG. 3) move substantially or fully upwards into the distillation apparatus by way of passage into the outer cover (between walls 50) and/or into the lower collector region 60.

As shown by FIGS. 3-5, the bottom side 29 of fraction collector 22, which is partially formed by the lower curvilinear section 28 of the walls of fraction collector 22, can be flat/horizontal around an opening which a top edge 40 of tube 44 extends there-through.

Additionally, in some embodiments, a portion of the tube 42 extends through an area in between the top part of the lower collection area 60 and the bottom part 29 of the fraction collector 22. That is, the tube 42 extends into an area which is primarily and/or mostly an encapsulated part of the fraction collector 22 in these embodiments.

Also shown more clearly in FIGS. 3-5 are a rejection area 66 at a top of lower collection area 60 and a product collection area 68 at a bottom of fraction collector 22.

As shown in this embodiment, particularly that of FIG. 3, the intake tube 86 and outtake tube 88 terminate at portals 85 and 87, respectively. In some embodiments, these tubes extend past these portals and instead terminate within the cooling jacket interior space 82. Furthermore, in this embodiment, the interior space 82 of the cooling jacket 80 has a substantially identical height, width, and depth at every parallel horizontal or vertical cross section. In various other embodiments, some horizontal or vertical cross sections differ from other horizontal or vertical cross sections in at least one dimension.

In this embodiment, the intake tube 86 and the outtake tube 88 are substantially parallel and horizontal. In various embodiments of the disclosed technology, one or both of the intake tube 86 and the outtake tube 88 are angled above and/or below a horizontal plane which passes through portals 85 and/or 87 and are angled to a right side and/or a left side of a vertical plane which assesses through portals 85 and/or 87. Furthermore, in other embodiments, each of intake tube 86, outtake tube 88, intake portal 85, and/or outtake portal 87 may be a plurality of, respectively, intake tubes, outtake tubes, intake portals, and/or outtake portals. Each individual component of the plurality of intake tubes, outtake tubes, intake portals, and/or outtake portals may be substantially identical or non-identical in size and/or shape.

Figure 6:
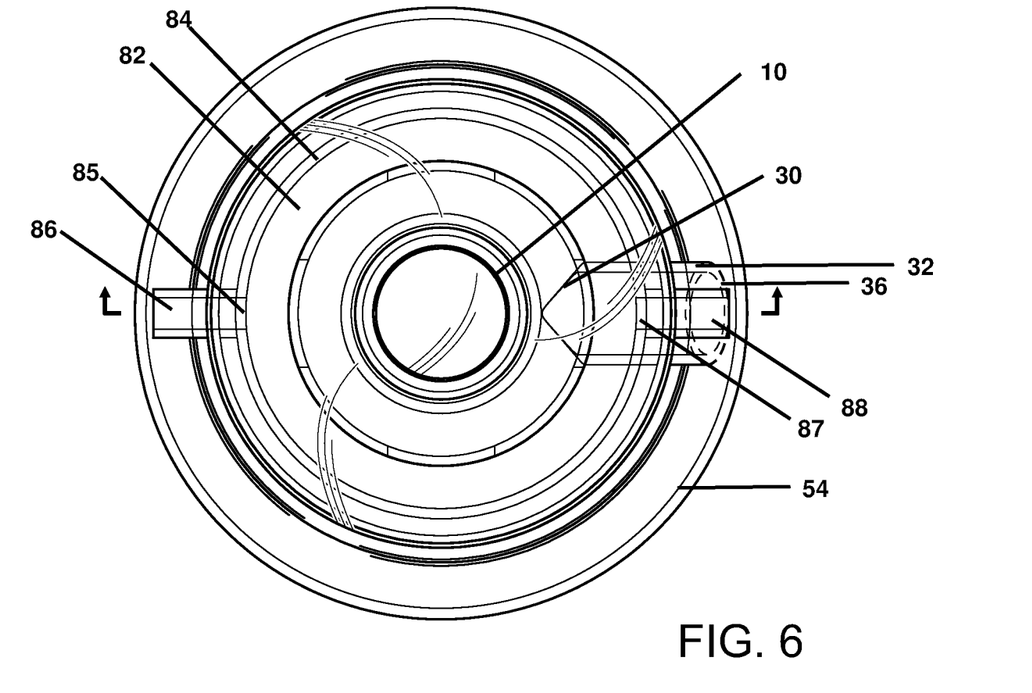
FIG. 6 shows a top plan view of the distillation apparatus of FIG. 1.
Figure 7:
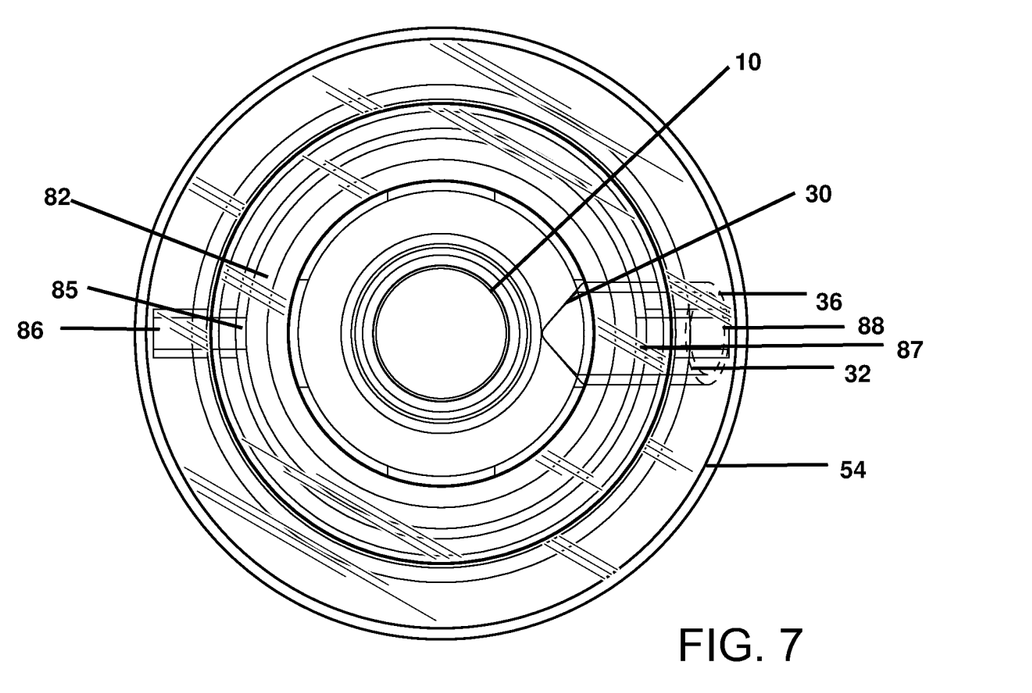
FIG. 7 shows a bottom plan view of the distillation apparatus of FIG. 1.

FIG. 6 shows a top plan view of the distillation apparatus of FIG. 1. FIG. 7 shows a bottom plan view of the distillation apparatus of FIG. 1. As shown by these figures, in an embodiment, the flared edge 54 of the side walls 50 of the outer cover 20 have a horizontal circumference which is substantially the largest horizontal circumference of any component of the device shown.

Figure 8:
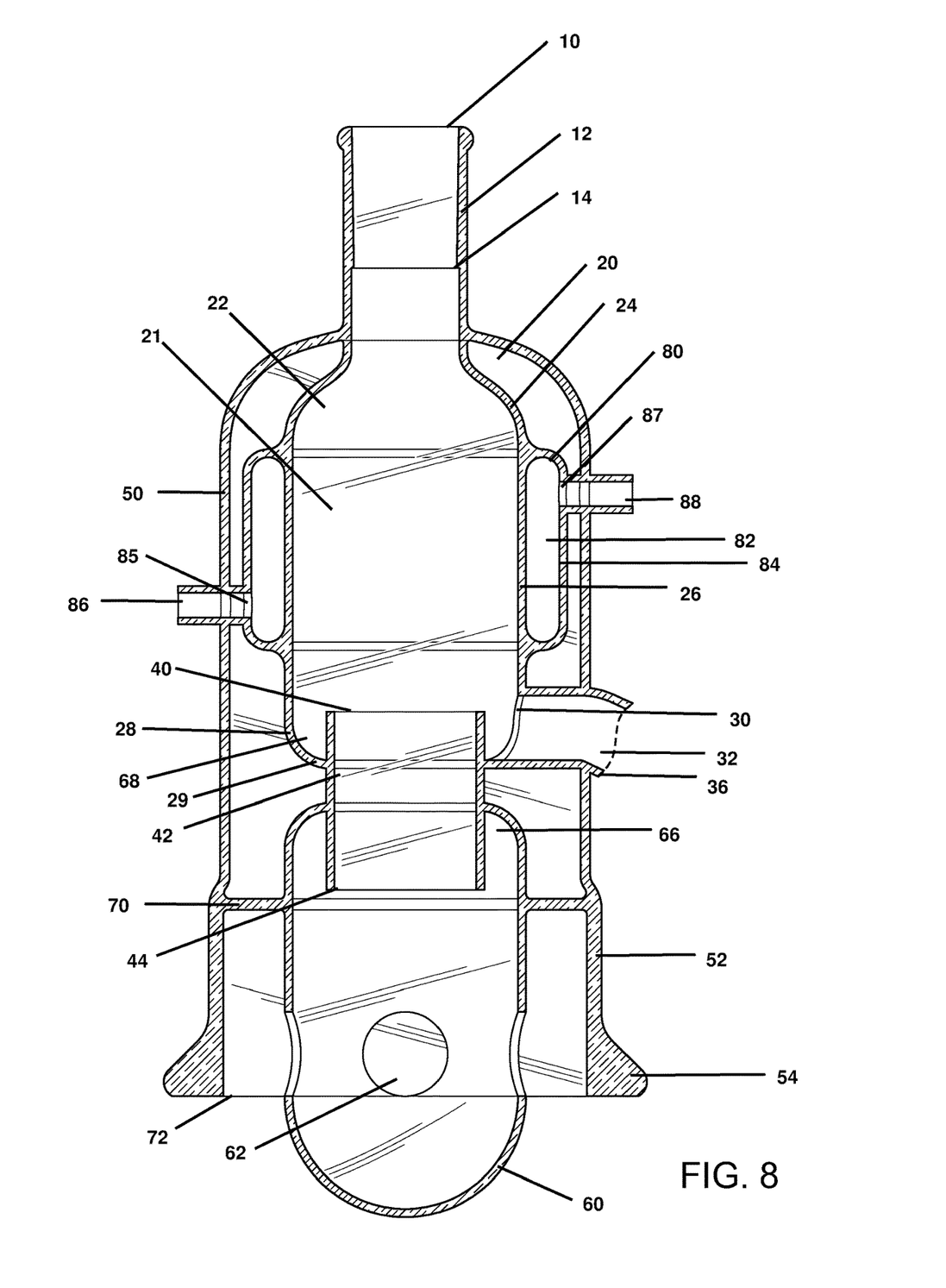
FIG. 8 shows a vertical cross section of the distillation apparatus of FIG. 1.

FIG. 8 shows a vertical cross section of the distillation apparatus of FIG. 1. As shown clearly in this embodiment, the horizontal seal 70 of the outer cover 20 is connected to the wider region 52 at the bottom of side walls 50 of the outer cover 20. In various embodiments, at least a part of the horizontal seal 70 may be situated at an angle. It may also, in embodiments, be connected to a different part of the side walls 50 of the outer cover 20.

Figure 9:
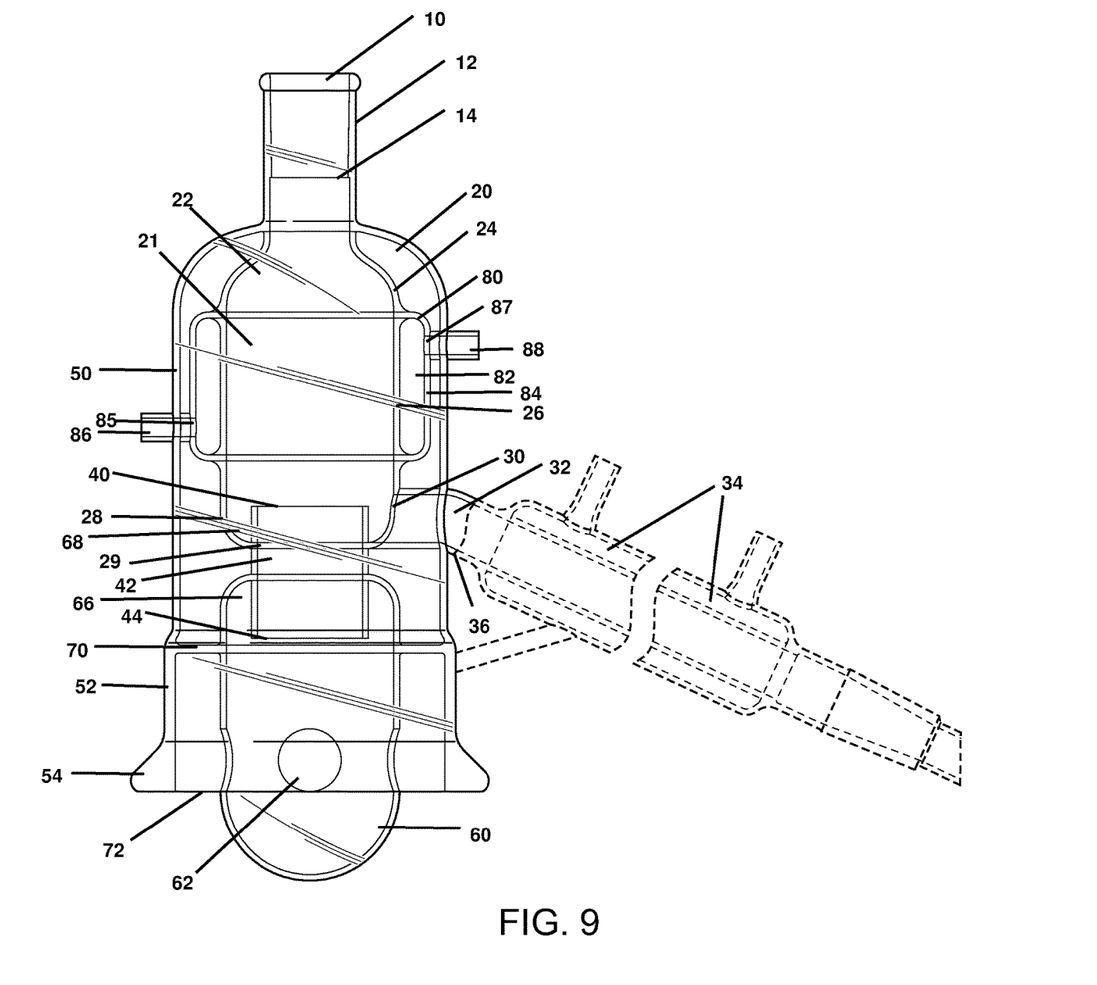
FIG. 9 shows a side elevation view of the distillation apparatus of FIG. 1 with an attached condenser unit.

FIG. 9 shows a side elevation view of the distillation apparatus of FIG. 1 with an attached condenser unit. As shown in this embodiment, the collection area 68 at the bottom of the fraction collector 22 is wholly below and/or inline with side exit portal 30. Furthermore, in various embodiments, the condenser entry area 32 has an outward edge 36 which extends outward from and at a downward angle relative to a horizontal plane. Condenser 34 is situated at a substantially identical downward angle as that of the outward edge 36 of condenser 34.

Figure 10:
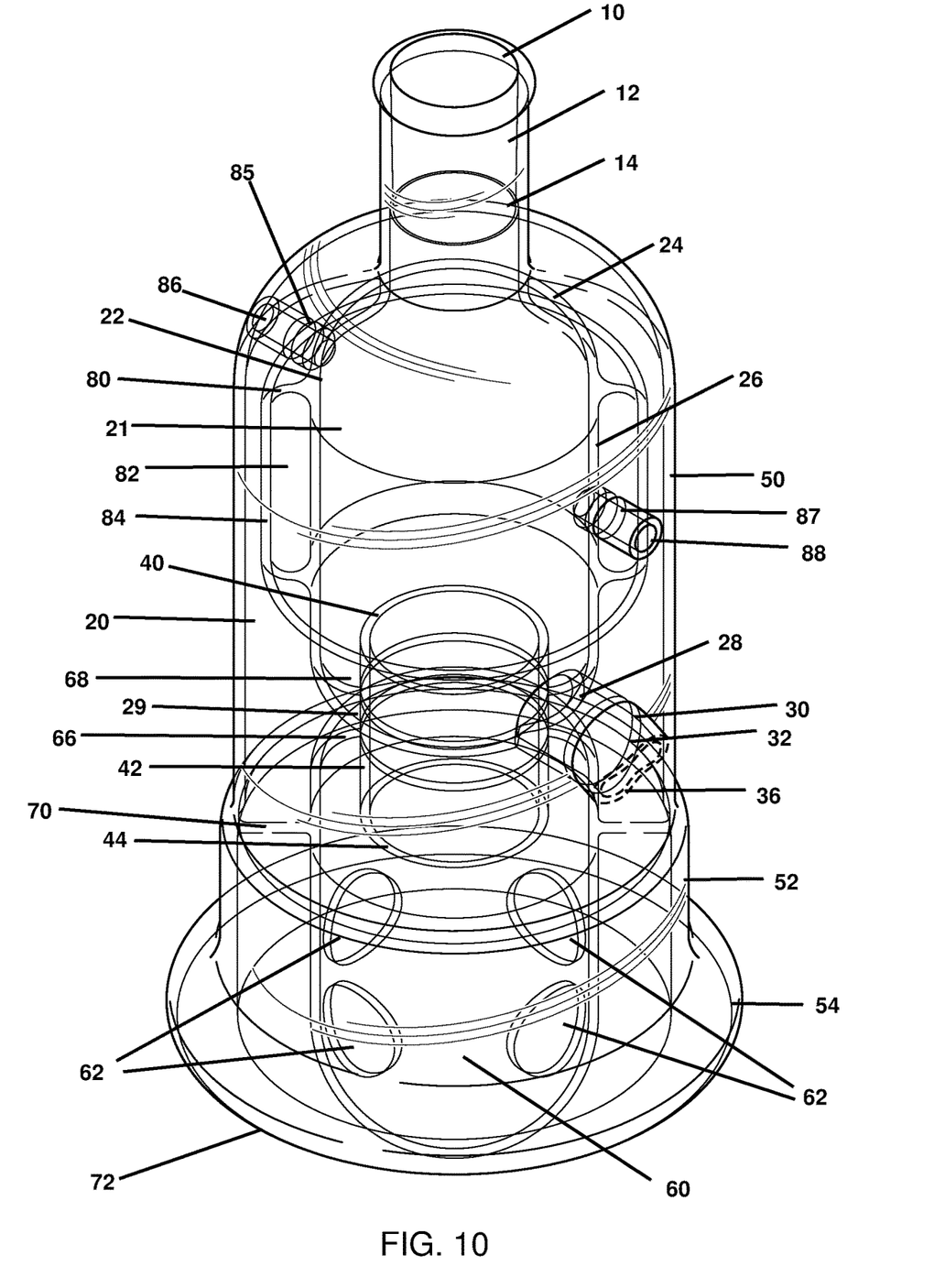
FIG. 10 shows a top and side perspective view of a distillation apparatus of other embodiments of the disclosed technology.
Figure 11:
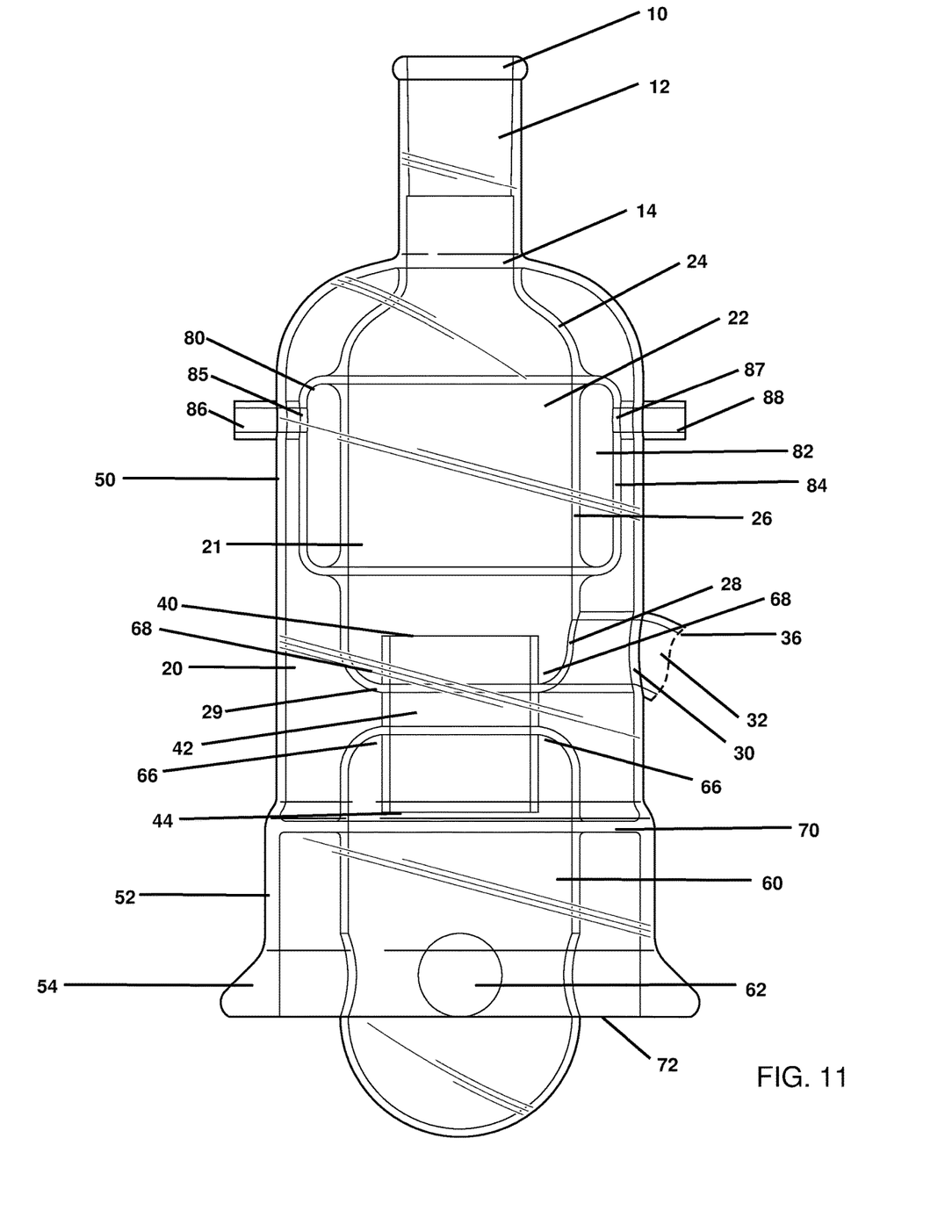
FIG. 11 shows a front elevation view of the distillation apparatus of FIG. 10.

FIG. 10 shows a top and side perspective view of a distillation apparatus of other embodiments of the disclosed technology. FIG. 11 shows a front elevation view of the distillation apparatus of FIG. 10. As shown in these figures, in another embodiment, the intake tube and portal 86, 85 are substantially or completely horizontally inline with the outtake tube and portal 88, 87, rather than substantially vertically below outtake tube and portal 88, 87.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalence of the claims are to be embraced within their scope. Combinations of any of the methods, systems, and devices described herein-above are also contemplated and within the scope of the disclosed technology.

The invention claimed is:

1. A distillation apparatus comprising:
   a lower end entry portal;
   a fraction collector including an upper curvilinear section, a middle vertical extent, a lower curvilinear section, the middle vertical extent extending between the upper curvilinear section and the lower curvilinear section, and an interior space;
   a vertically extending passageway extending from said lower end entry portal to said interior space of said fraction collector; and
   a cooling jacket surrounding at least a part of and less than a full amount of said middle vertical extent of said fraction collector;
   wherein a majority of the fraction collector is open and unblocked.

2. The distillation apparatus of claim 1, further comprising:
   a lower collection region including an interior space;
   a tube extending between said interior space of said fraction collector and said interior space of said lower collection region; and
   an outer cover surrounding said fraction collector, said cooling jacket, at least a majority of said vertically extending passageway, said tube, and at least a part of a majority of said lower collection region, said outer cover defining a separate interior space between said cooling jacket and said outer cover;
   wherein an intake and an outtake of said cooling jacket pass through said outer cover.

3. The distillation apparatus of claim 2, wherein the interior space adjacent to the upper curvilinear section and the middle vertical extent is open and unblocked, and the interior space adjacent to the lower curvilinear section includes a portion of the tube.

4. A distillation apparatus comprising:
a lower end entry portal;
a fraction collector including an upper curvilinear section, a middle vertical extent, a lower curvilinear section, the middle vertical extent extending between the upper curvilinear section and the lower curvilinear section,
a vertically extending passageway extending from said lower end entry portal to an interior space of said fraction collector;
a cooling jacket surrounding at least a part of said middle vertical extent of said fraction collector, wherein said cooling jacket is in a shape of a halo;
a lower collection region including an interior space;
a tube extending between said interior space of said fraction collector and said interior space of said lower collection region;
and an outer cover surrounding said fraction collector, said cooling jacket, at least a majority of said vertically extending passageway, said tube, and at least a part of a majority of said lower collection region, said outer cover defining a separate interior space between said cooling jacket and said outer cover.

5. The distillation apparatus of claim 3, wherein said fraction collector comprises an outer wall with:
said curvilinear upper section;
said curvilinear lower section; and
said vertical middle section, said vertical middle section forming a unitary structure between said curvilinear upper section and said curvilinear lower section;
wherein said vertical middle section is simultaneously an interior wall of said cooling jacket.

6. The distillation apparatus of claim 5, wherein said separate interior space is separate from a continuous passageway formed within said vertically extending passageway, said fraction collector, a side exit portal of said fraction collector, and a top portal of said fraction collector, said interior space being majority open.

7. The distillation apparatus of claim 5, wherein an entirety of a vertical extent of said interior wall of said cooling jacket is simultaneously a part of an exterior wall of said fraction collector.

8. The distillation apparatus of claim 7, wherein an exterior wall of said cooling jacket is unbroken but for said intake and said outtake.

9. The distillation apparatus of claim 8, wherein said outer cover directly surrounds an entirety of a vertical extent of said exterior wall of said cooling jacket and said upper and said lower portions of said wall of said fraction collector; and
said vertical middle wall of said fraction collector is surrounded by both said outer cover and said cooling jacket.

10. The distillation apparatus of claim 9, wherein an entirety of said cooling jacket is above a side exit portal of said fraction collector.

11. The distillation apparatus of claim 10, wherein said tube includes a top edge having an upper portal opening disposed within said interior space of said fraction collector and a bottom edge having a lower portal opening disposed within said interior space of said lower collection region, said top edge of said tube extends into a part of said fraction collector surrounded by said lower portions of said wall of said fraction collector and which terminates inline with a part of said side exit portal which is below a top part of said side exit portal, said top edge situated below a horizontal plane of a lowest edge of said cooling jacket.

12. The distillation apparatus of claim 11,
wherein a largest horizontally-oriented circumference of said lower collection region is wider than a largest horizontally-oriented circumference of said tube; and
wherein said largest horizontally-oriented circumference of said lower collection region is substantially equal to a horizontally-oriented circumference of said interior wall of said cooling jacket.

13. The distillation apparatus of claim 12, wherein said cooling jacket intake is situated horizontally inline with said cooling jacket outtake.

14. The distillation apparatus of claim 12, wherein all horizontal planes passing through said cooling jacket intake are below all horizontal planes passing through said cooling jacket outtake and said cooling jacket outtake is vertically inline with said side exit portal.

15. A distillation apparatus comprising:
a first continuous internal region with vertical extent from a bottom section of said apparatus to a side exit portal;
a cooling jacket with a second continuous internal region surrounding a portion of said vertical extent of said first continuous internal region, wherein said second continuous internal region is separate from, and lacking portals to, said first continuous internal region
a third continuous internal region surrounding said cooling jacket and said second continuous internal region;
an outer cover surrounding each of substantially an entirety of said first continuous internal region, said cooling jacket, and said third continuous internal region;
an intake extending from said exterior wall of said cooling jacket through said third continuous internal region to said outer cover; and
an outtake extending from said exterior wall of said cooling jacket through said third continuous internal region to said outer cover;
wherein said side exit portal extends from an exterior wall of said vertical extent through said third continuous internal region to said outer cover; and
wherein at least a part of an interior wall of said cooling jacket is simultaneously a part of an exterior wall of said vertical extent of said first continuous internal region.

16. The distillation apparatus of claim 15, wherein said first continuous internal region extends below said cooling jacket.

17. The distillation apparatus of claim 16, wherein all horizontal planes passing through said side exit portal are below all horizontal planes passing through each of said intake and said outtake.

18. The distillation apparatus of claim 15, wherein said first internal region further comprises a fraction collector having a horizontally-aligned circumferences greater than a portion of a rest of said first internal region there-below;
wherein said cooling jacket surrounds said fraction collector portion of said first continuous internal region.

19. A distillation apparatus comprising:
a first continuous internal region with vertical extent from a bottom section of said apparatus to a side exit portal; and
a cooling jacket with a second continuous internal region surrounding a portion of said vertical extent of said first continuous internal region, wherein said second continuous internal region is separate from, and lacking portals to, said first continuous internal region;

wherein said bottom section includes a narrower portion and a wider portion, said narrower portion extending above a lowest horizontal plane of said wider portion; and wherein said cooling jacket has a lowest horizontal plane above each of said narrower portion and said wider portion.

\* \* \* \* \*